Fig. A

May 5, 1942.    C. W. HANSELL    2,282,295
OSCILLATION GENERATION AND CONTROL
Filed Nov. 16, 1938    4 Sheets-Sheet 2

INVENTOR
C. W. HANSELL
BY
ATTORNEY

May 5, 1942.    C. W. HANSELL    2,282,295
OSCILLATION GENERATION AND CONTROL
Filed Nov. 16, 1938    4 Sheets-Sheet 3

INVENTOR
C. W. HANSELL
BY
ATTORNEY

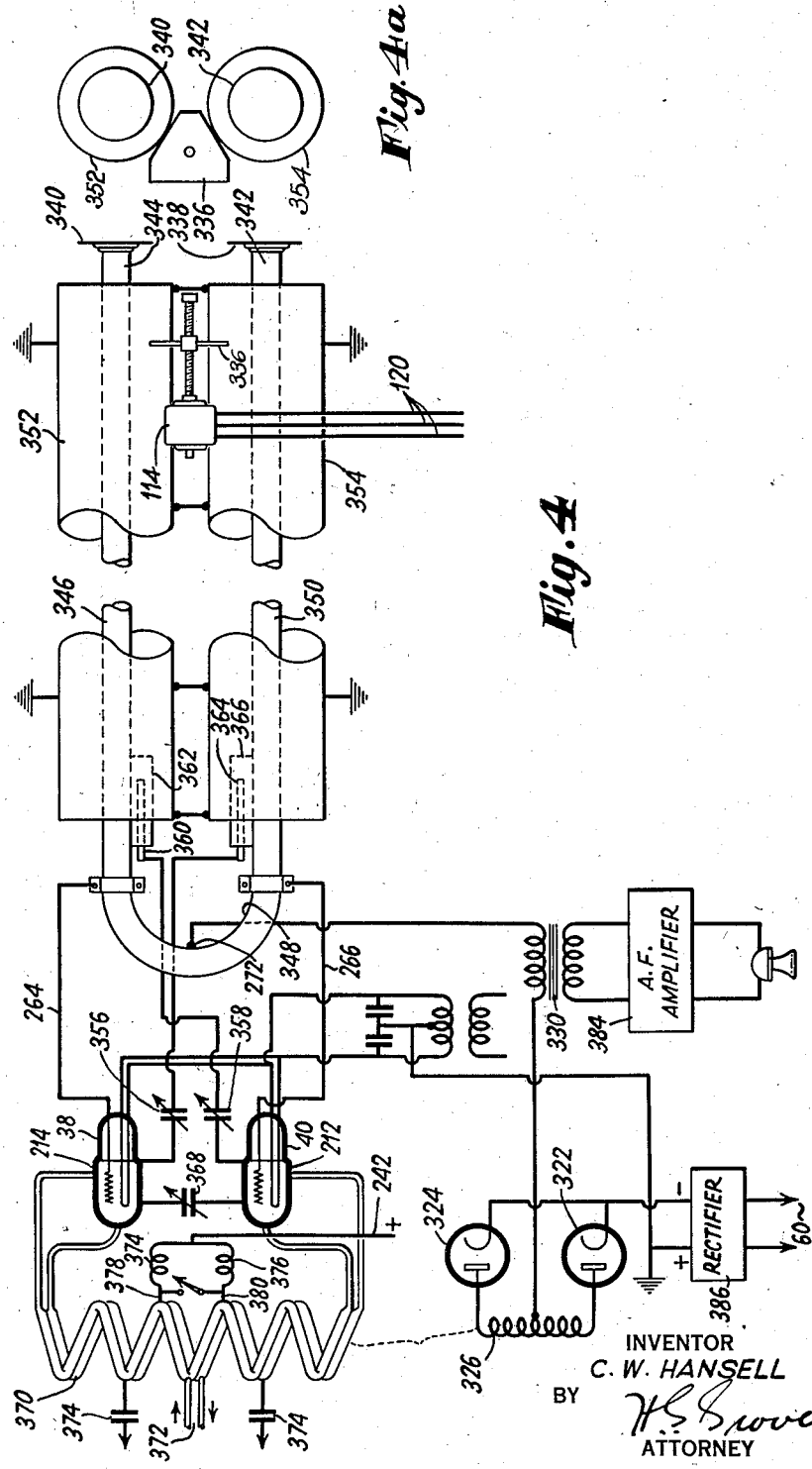

Patented May 5, 1942

2,282,295

UNITED STATES PATENT OFFICE 2,282,295

OSCILLATION GENERATION AND CONTROL

Clarence W. Hansell, Port Jefferson, N. Y., assignor to Radio Corporation of America, a corporation of Delaware Application November 16, 1938, Serial No. 240,629

2 Claims. (Cl. 179—171.5)

My present invention relates to the production and control of high powered short waves of constant frequency and is a continuation in part of my United States application Serial #692,092 filed October 4, 1933, now Patent #2,095,980, dated October 19, 1937, and of my United States application Serial #141,467, filed May 8, 1937, now Patent #2,160,655, dated May 30, 1939.

My present application discloses a new and improved method of and means for modulating high frequency oscillations, and is particularly adapted for use with generators as described in said aforesaid applications.

In describing my invention in detail reference will be made to the attached drawings, wherein:

Figures 4 and 5 are further modified forms of long line controlled transmitters for short waves incorporating therein modulating systems especially adapted therefor; and Figure 4a is an end view of the line of Figure 4.

Figure 1:
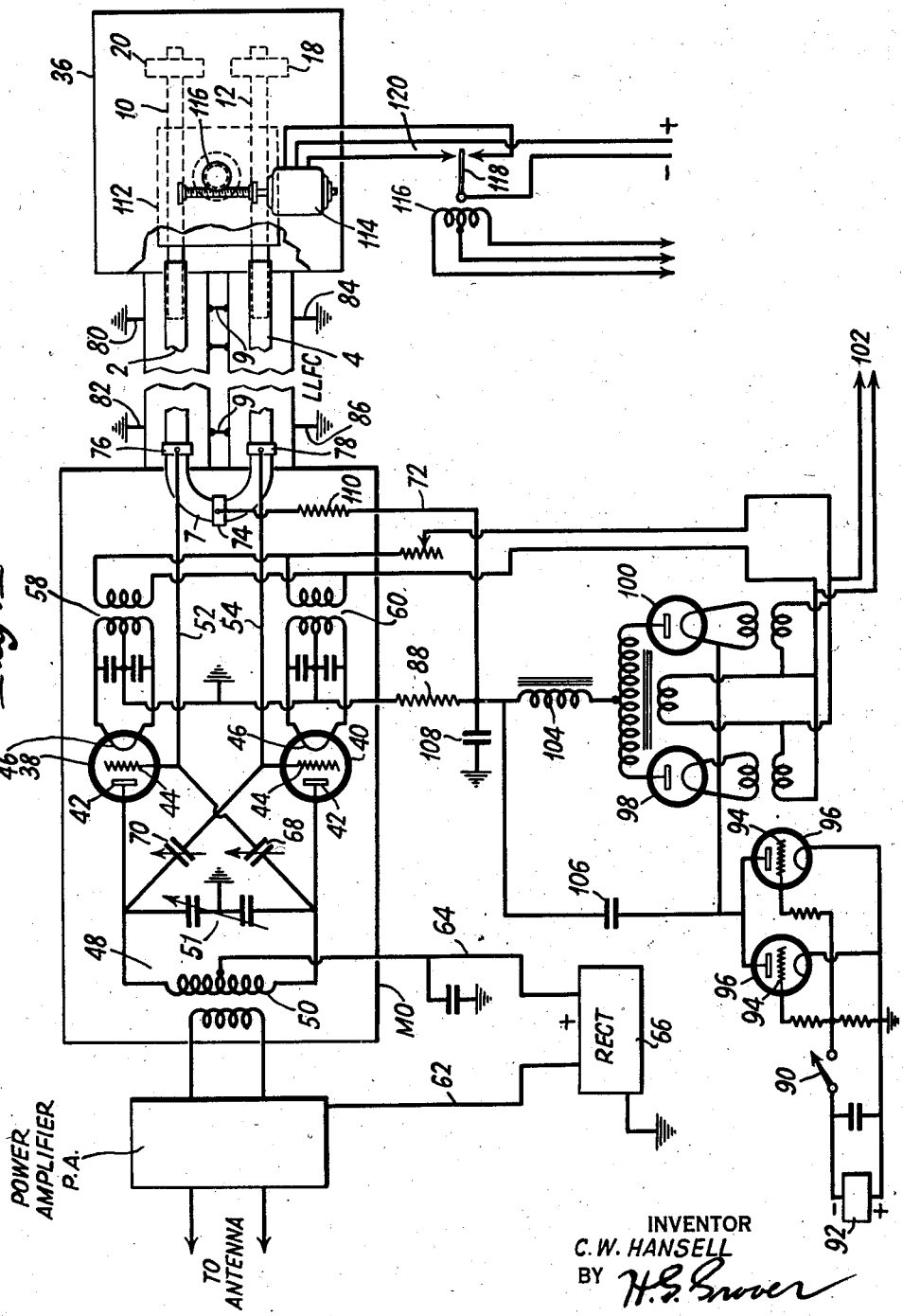
Figure 1 illustrates schematically the electrical circuits of a high frequency transmitting system in which automatic frequency comparison and control with a standard source may be obtained with means for modulating the transmitted high frequency wave.

In Figure 1, the master oscillator comprises a pair of electron discharge devices 38, 40 preferably of the water cooled variety, each having a plate or anode 42, a grid or control electrode 44, and a cathode or filament 46. Across the anodes of the vacuum tubes 38, 40, there is connected a parallel tunable circuit 48 consisting of an inductance coil 50 and a variable condenser 51. The circuit 48 acts as a rough frequency controlling circuit for controlling the frequency of oscillation of the push-pull connected electron discharge devices 38, 40. The line LLFC which may be long for frequency control is connected through conductors 52, 54 directly and conductively to the grids 44, and acts to accurately maintain the frequency of oscillation and hence the output of the master oscillator MO at a desired constant operating frequency. The action of the long line LLFC for frequency control and several alternative detail arrangements are explained more fully in my United States Patent #1,945,546, dated February 6, 1934. Briefly, the action of the resonant line for frequency control may be explained by considering the line to be an exceedingly sharp resonant circuit which causes the oscillator to oscillate very constantly at its sharply resonant frequency. In another light it may be said that waves traveling down the line are reflected back so that standing waves on the line pull or lock the oscillations generated into step with the standing waves, and since the standing waves depend primarily upon the length of the line for their frequency it will at once be seen that the length of the line is the prime determining factor for frequency control. From still another angle it can be said that the standing waves on the line consist of an ingoing wave and a reflected wave, and the line tends to act so as to maintain substantially zero difference between the ingoing and reflected wave, and since any shift in frequency away from the frequency for which the line is a correct number of quarter wavelengths long will not give the zero phase difference, the line tends to react upon the system so as to establish the zero phase difference.

The filaments are supplied with heating potential from a source connected to lines 102 supplying filament transformers 58, 60. In some cases I prefer to supply the two filament transformers 58, 60 from different phases of a two phase power supply in order to balance out much of the disturbing effects of alternating heating current. High voltage plate supply is obtained from leads 62, 64, connected to a rectifier 66.

The neutralizing condensers 68, 70 cross-connecting the anodes and control electrodes of tubes 38, 40, are adjusted so as to cause sufficient feedback for oscillation generation. Another feature of my present invention resides in the adjustment of these condensers so that the phase of the voltage on the grids is in advance, or in other words, so that the grid voltage leads the plate voltage. This adjustment is obtained by making the capacity of the neutralizing condensers somewhat larger than that required to cause perfect neutralization. By virtue of this adjustment appreciably better power efficiency than when using lagging phase is obtained, as, for example, by setting the neutralizing condensers below the neutralizing point. By the use of over neutralization, I have found that there is an improvement in efficiency and this may be explained by considering that the time of travel of electrons in the tubes tends to make the plate current and the voltage lag behind the grid voltage. By making the phase of the grid voltage lead, the effect of time of electron travel is counterbalanced as a consequence of which more nearly optimum adjustments are obtained. This shift in phase due to time of electron travel is a minor factor in neutralized amplifiers because of the fact that the relative phase of the grid and anode voltage is not important. However, I have found that it becomes quite an appreciable factor in oscillation generators particularly of the water cooled type and particularly when used at the shorter wavelengths.

It should also be noted that, in the line controlled oscillator, the losses in the line constitute the greater part of the total load. If the oscillator were adjusted for oscillation by virtue of under neutralization the effective resistance in the grid circuit would give the grid voltage a phase shift in a lagging direction and this added to the phase shift due to time of electron travel might come to a considerable total. On the other hand, if oscillation is obtained by over neutralization, the line losses cause a shift in grid voltage phase in a leading direction so that the final resultant phase shift is the difference between that due to line losses and time of electron travel. In cases where the plate circuit losses are predominant, as may be the case where the oscillator feeds energy directly to an antenna, it may be preferable in some cases to obtain oscillation by under neutralization in order to obtain optimum phase relations between anode and grid radio frequency voltages. In any case I choose between over and under neutralization to obtain optimum efficiency and the choice is principally governed by the distribution of loading in the circuits.

Grid bias and modulating potentials may be supplied through conductor 72 connected to a metallic slip ring 74 at the electrical center of the long line 2, 7, 4 which usually will be found at the midpoint of the C-shaped portion 7 of the line 2, 7, 4. The grids may be connected to similar adjustable slip rings 76, 78 and all three rings 74, 76, 78 may be provided with set screws which may, if desired, be soldered or brazed into fixed position after final adjustments have been made. The point 76, 78 should be chosen a sufficient distance away from the electrical center 74 upon the long line tube system so as to provide the proper control voltages for the grids 44 of the tubes 38, 40, when the line has the desired amount of circulating radio frequency energy.

Preferably I make the long line system including the inner hollow piping 2, 7, 4 and the outer hollow pipes or cylinders 6, 8 of solid copper. If desired, of course, the inner pipe may be made of other materials with a copper tubing or a sufficiently heavy copper plating at the surface thereof since at the high frequencies involved most of the current will tend to flow in the outermost surface of the tubing. To further reduce losses the inner pipe or line 2, 7, 4 may be made of copper and plated with a material of lesser resistivity such as silver. In cases where constancy of effective resistance is important a thin layer of gold on the surface is desirable. Gold has somewhat higher resistivity than silver or copper but is more free from tarnishing and therefore more constant. Also untarnished gold surfaces may very well have less energy losses than tarnished silver or copper surfaces. The cost of gold plating is not prohibitive at extremely high frequencies where the length of line is small.

As illustrated, the legs of the frequency controlling line are transversely spaced and arranged parallel to each other. The outer pipes 6, 8 prevent undesired radiation from the frequency controlling lines and protect it from disturbance due to other nearby equipment.

Figure 2:
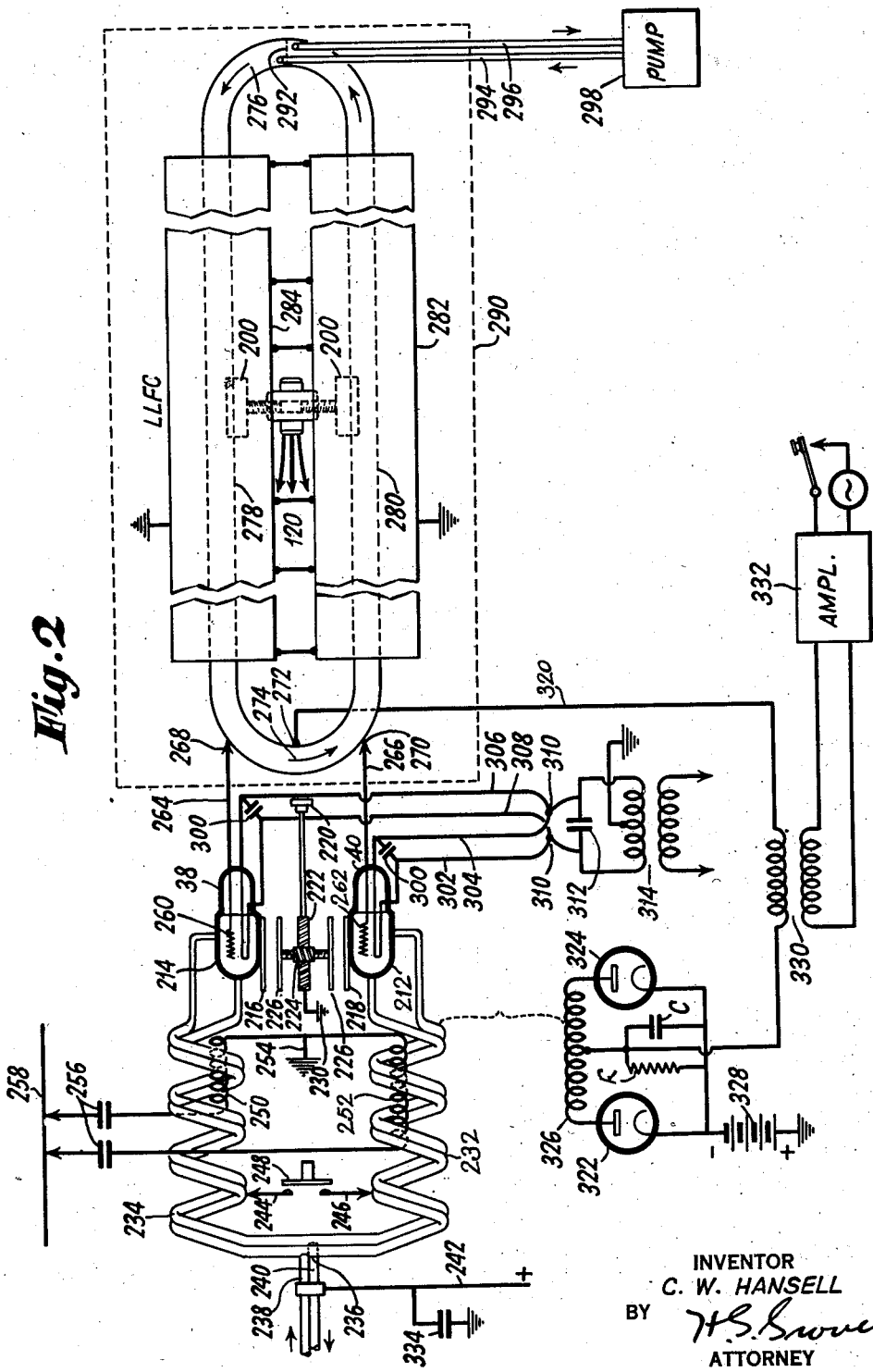
Figures 2 and 3 are modifications of my improved long line frequency controlled transmitter especially adapted for shorter waves.

The minimum length of line which it is preferred to use as a stabilizing resonant circuit is substantially one-quarter wavelength, but, for pushpull use as illustrated in Figures 1 and 2, it is desirable and convenient to use a line whose total length is one-half of the wavelength of the desired operating frequency. The half wavelength is folded up upon itself as illustrated to form a U, which from one extreme end to the other is approximately one-quarter wavelength of the operating frequency. By making the line longer and in this particular case any number of half wavelengths long, its energy storage capacity is increased giving rise to increased stability as well as reducing temperature rise due to its own losses. The amount of energy which may be stored in a line is roughly proportional to its length, and the temperature increase for a given storage of energy is roughly inversely proportional to its length. For most practical purposes I prefer to make the long line system one-half wavelength in length.

For modulating the system shown in Figure 1, the plate voltage may be varied by introducing modulating potentials into the plate voltage lead 64 by means of a transformer or the grid voltage may be modulated by similarly introducing modulating voltages in the grid biasing lead 72. A convenient scheme for modulating the apparatus for code signalling as illustrated is described more fully in my Patent No. 2,060,988, dated November 17, 1936. As illustrated in Figure 1 the oscillator grid negative bias potential is obtained by passing the rectified grid current of the tubes through the common grid resistor 88. The transmitter is keyed by imposing a higher negative potential on the oscillator grids from the keying circuit which consists of a key or relay 90 applying and removing negative potential from source 92 to the grids 94 of the parallel connected keying tubes 96. The two rectifier tubes 98, 100 by rectification action rectify voltages from the source connected to lines 102 for use as negative cut-off bias for the two oscillator tubes 40, 38. Reactor 104 and condenser 106 act to smooth the rectified keying voltages.

When key 90 is down and applies negative potential to the grids 94 of the keying tubes 96, tubes 96 are biased to cut-off. Consequently, the bias rectifier 98, 100 is rendered inoperative so that no negative potential is applied to the grids 44 of the radio frequency oscillator tubes 38, 40. When the key 90 is up the grids 94 of tubes 96 assume filament potential as a consequence of which the tubes 96 become conductive allowing current flow from rectifiers 98, 100 to flow through resistor 88 as a result of which conductor 72 impresses a high negative bias upon the grids 44 of the radio frequency oscillation generator such that oscillation ceases. In passing it may be noted that the resistance 88 is common to both the oscillator and the keying circuit. Condenser 108 is the radio frequency by-passing condenser and the resistor 110 is provided to assist resistor 88 in establishing a grid bias for the grids 44 under oscillating conditions in tubes 38, 40. The resistor 110 is not essential to the operation of the system but is preferred in some cases, since it assists in preventing spurious oscillations.

As the long line frequency controlled oscillators such as shown in Figure 1 are often placed out in the field with inexperienced help or placed in inaccessible places, and since for some reason or another there may be a slight drift in frequency, I have provided means as shown in Figure 1 for automatically correcting the frequency of the transmitter system so as to correspond with and closely follow some master controlling frequency such as may be generated by a carefully controlled piezo-electric crystal controlled oscillator. As shown in Figure 1, the frequency controlling means for the long line system consists of a rectangular metallic plate 112 raised or lowered by reversible electric motor 114 through the medium of worm gear and screw mechanism 116. The metallic plate 112 is grounded and by moving it further away from or nearer to the long line extension tubes 10, 12, the capacity between the ends of the line or between each end and ground is increased or decreased thereby decreasing or increasing the frequency of operation. The motor 114 is operated by means of an electromechanical relay system 116 operating a switch 118 applying reversing potentials through leads 120 to the motor 114.

In the long line very short wave system of Figure 2, the pushpull connected vacuum tubes 38, 40 are provided with fluid cooling or water cooling jackets 212, 214. The plate or anode circuit of the pushpull connected tubes 38, 40 includes the rectangular or circular flat capacity plates 216, 218 directly metallically connected to the water cooling jackets 212, 214. Rotation of knob 220 rotates the screw and gear mechanism 222 and hence the rotation of the internally threaded member 224 in turn causing the variable grounded plates 226 to approach or recede from the condenser plates 216, 218 simultaneously. As illustrated, condenser 226 may be grounded for purposes of symmetry through the gear mechanism and conductor 230. The inductance of the plate circuit is formed by bi-filarly wound metallic coils 232, 234 to the electrical center 236 of which, by means of inlet pipe 238 and outlet pipe 240, cooling fluid or water is introduced or removed from the anode jackets 214, 212. For very high frequencies the inductance of the plate circuit may be formed of straight pipes rather than coils. The water cooling system is described in greater detail in United States Patent No. 1,963,131, granted June 19, 1934, to H. E. Hallborg. Anode potential is applied through lead 242 connected to the inlet and outlet pipes 238, 240. If desired 240 may be made the inlet pipe and 238 the outlet pipe. Usually it is best to pass the cooling fluid through the jackets in an upward direction in order to assure that practically all air is forced out of the jacket leaving only the fluid in contact with the anode of the tube. The coils 234, 232 which act as the unitary structure for high frequency electrical currents but has a dual path for cooling fluid, are shown arranged so that their axes are parallel to the longitudinal cylindrical axes of the cooling jackets 214, 212. In practice I make the axes of the cooling jackets and of the straight or coiled plate circuit inductance vertical and so shaped that all the cooling fluid can drain out when the supply of fluid from a pump is interrupted. This prevents damage to the system from freezing of the fluid when water is used and facilitates the exchanging of tubes by prevention of spilling of the fluid when tubes are removed from the jackets. As an aid to prevention of freezing I may use various well known antifreezing mixtures for the cooling liquid.

For a change in frequency, there are provided the conductors 244, 246 which are variably tapped to the coils 234, 232, and by connecting the conductors 244, 246 together by means of a suitable switch 248 the effective inductance of the output circuits of the tubes may be varied and hence the frequency may be varied by a relatively large amount, connection of switch 248 to connectors 244, 246 acting to short circuit away a part of the inductance of the plate circuit of the pushpull oscillation generator. Tuning variation may also be accomplished by manipulation of knob 220 hence varying the plate tuning condenser 216, 226, 218. Output energy is taken by means of coils 250, 252 coupled respectively and inductively to the water cooled coils 234, 232. The coils 250, 252 may be connected together and to ground as at 254 and have their other ungrounded terminals connected through by-passing condensers 256 to a radiating antenna 258. The coils 250, 252 may be insulatingly supported within and coaxially with the water cooled coils 234, 232, or if desired may be wound about and insulatingly supported from the water cooled coils. If the inductance 232, 234 is formed of straight tubing, as would be the case at very high frequencies then the coupling 250, 252 may also be made of straight conductors placed parallel to and near the conductors 232, 234.

The grids 260, 262 of the tubes 38, 40 are variably connected through connectors 264, 266 to points 268, 270, on either side of the electrical center 272 of the resonant line LLFC for frequency control. Since the system of Figure 2 contemplates the use of very short waves, the long line for frequency control is made in the form of a continuous flattened ellipse with two trough, bent, bottom or C portions 274, 276, the midpoints of each trough or elbow portion 274, 276 being at a voltage nodal point. Intermediate the troughs the portions 278, 280 are linear or straight and are arranged parallel to each other. For frequency adjustment it is preferred that the capacity elements 200 be arranged opposite the midpoint or at a current maximum point on the inner tubular conductor forming part of the long line frequency control system. About the straight portions 278, 280 of the inner tubular conductor of the long line system there are suitably mounted concentric linear conducting tubes or pipes 282, 284 suitably cross-connected and grounded along their length so as to maintain them at zero radio frequency potential. If desired the outer conductors 282, 284 may be made continuous and completely concentric around the inner conductors 274, 276, 278, 280, but in that case openings for the various connections to the inner transmission line 274, 280, 276, 278 should be provided. The dimensioning of the long line system is preferably made in accordance with that specified for the long line system of Figure 1 and hence for the sake of brevity will not be repeated here. The overall length of the long line system shown in Figure 2, that is to say, the mean length of the inner conductor 274, 278, 276, 280, should preferably be a whole number of half wavelengths long, including unity, at the desired operating frequency. For adjustment to different frequencies, it should be noted that the same line would be effective for approximately harmonically related frequencies. Hence, by suitably tapping conductors 244, 246 to the water cooled coils, quick change to a harmonically related frequency and stabilization on the same long line may be obtained by the connection of short circuiting strap 248 to the contacts 244, 246. Where operation is desired at frequencies which are not harmonically related, I may also provide means for quickly changing the effective length of the line by means of switching in or out sections of line, shunt or series inductance, capacity, etc.

If desired, the resonant line system may be placed within a suitable container 290 of heat insulating material and the long line system temperature controlled. Moreover, a wall 292 may be placed across one end of the line and temperature controlling fluid fed on one side of the wall 292 through tube 294 and removed from the other side of the wall by tube 296, the circulation of fluid through the inner conductor being as indicated by the arrows. Suitable pumping mechanism 298 may be provided for causing a continuous circulation of the temperature controlling fluid in the long line which may be water or oil maintained at a suitable temperature or which may be air or any gas. In case the circulating liquid or the gas is held at a temperature below that of the room or space around the line then some hydroscopic material should be placed within the heat insulating material 290 to prevent the formation of water drops upon the long line system. Such condensation, it should be noted, would tend to change the operating frequency, due to the fact that it would change the velocity of the electrical waves along the line.

As a further aid to short wave operation, the legs of the filaments of the tubes 38, 40 may be short circuited together for high frequency currents by means of by-passing condensers 300 so that the filament heating conductors 302, 304 act in parallel for high frequency, as do also filament heating conductors 306, 308. At the electrical centers 310, 310, of the loops formed by the heating conductors 302, 304, 306, 308, another by-passing condenser 312 may be connected and filament heating energy applied adjacent thereto, as for example, by feeding low frequency heating currents thereto by means of a transformer 314. The conductors 302, 304, 306, 308 will act, by judicious choice of their length, as a tuned filament circuit for the high frequency waves and their impedance should be so adjusted as to obtain optimum operating conditions, that is to say, so that the filaments fluctuate at high frequency potential at a desired amount and with the desired phase relation.

For modulation any of the schemes described in connection with Figure 1 may be used, it being noted in addition that the source 92 of Figure 1 may be replaced by an amplified alternating current source such as a keyed tone source, or, by amplified voice currents. Also source 92 may consist of a rectifier supplied with amplified and keyed or modulated relatively low frequency current. For example, in one application of my invention, telegraph signals are sent, from an automatic sender in a central telegraph office, over a wire line, as one channel of a number of channels carried by the same line, to a radio transmitting station. At the radio station, filters separate the signals of the several channels by frequency discrimination. The energy of one or more channels is then amplified and rectified to supply the input to a transmitter at the point indicated as 92 in Figure 1. As the service requires, the automatic telegraph sender in the central office may be replaced by automatic printer mechanism or by a facsimile transmitter.

A desirable scheme for modulating a line controlled system is illustrated in Figure 2. Grid bias is fed through conductor 320 to the electrical center 272 of the long line and thence through conductors 264, 266 to the grids 260, 262 of vacuum tubes 38, 40. Variation in the grid bias as impressed by conductor 320, will cause modulation of the output of the frequency controlled system. A pair of diode rectifiers 322, 324 are coupled by means of their plate coil 326 symmetrically to the plate circuit of the pushpull connected tubes 38, 40. By coupling the rectifier coil 326 sufficiently close to the plate circuit, enough of the radio frequency energy developed by the oscillator will be rectified and cause sufficient drop in the resistor R and across radio frequency by-pass condenser C so as to limit the oscillator output.

In addition to this rectifier system for obtaining grid bias, there is serially connected a battery 328 which may be replaced by a potentiometer resistor supplied with voltage from a 60 cycle rectifier system. This second source of negative potential 328 serves to adjust the circuits for best operating characteristics.

In operation, the two sources of grid bias, namely, source 328 and the bias developed by rectifiers 322, 324 should be adjusted to limit the oscillations developed by the pushpull amplifiers 38, 40 to about half of the maximum amplitude. In series with the bias sources there is connected the secondary of a low frequency transformer 330 supplied with amplified tone currents or voice currents from an amplifier 332. The fluctuations in grid bias due to the alternating voltages developed in the secondary of transformer 330 will then vary the output from the oscillator in accordance with modulation.

The advantage of this modulation system resides in the relatively small size of the modulation equipment and also in its relatively small cost.

The plate lead 242 is shown grounded for radio frequency currents by means of a by-passing condenser 334. It may be found desirable in suppressing spurious oscillations not to ground point 236, and in that event a high frequency choke should be inserted in series with the lead 242 and the end of the choke away from the point 236 should be connected to the by-passing condenser 334.

Figure 3:
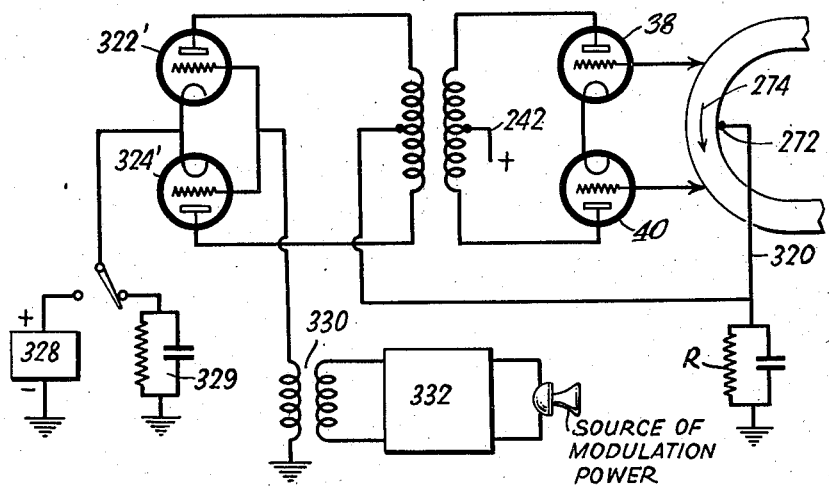

If desired, I may modify the modulating system of Figure 2 by using triode tubes 322' and 324' in place of the diodes shown at 322 and 324. This modification is shown in Figure 3. The triodes will then be supplied with direct grid biasing potential either from a separate source or by means of parallel resistance and capacity 329 connected between the cathodes and ground or source 328. The grid biasing potential to the triodes is then so adjusted that the drop across resistance R, or this drop plus the potential of source 328 when 328 is used, biases tubes 38, 40 to such an extent that approximately half maximum output current to the antenna is obtained. The output of amplifier 332 is then applied to the grids of the triodes 322', 324' which replace diodes 322, 324. Under these conditions the oscillator output will be modulated in accordance with the output from amplifier 332.

In the long line frequency controlled system of Figures 4 and 4a, the reversible motor 114 drives a triangular grounded metallic plate 336 back and forth so that the capacity between this plate and the end plates 338, 340 connected to the free electrical ends 342, 344 of the inner transmission line 346, 348, 350 is varied. The outer tubes or pipes 352, 354 are connected together and grounded as indicated and are used to shield the inner legs 346, 350 of the U-shaped frequency controlling tubular metallic transmission line.

As before the grids of the tubes 38, 40 are connected by means of conductors 264, 266 on opposite sides of the electrical center 272 of the inner concentric conductor. In addition to the neutralizing or feedback control condensers 356, 358, there are provided feedback condensers consisting of inner and outer cylinders 360, 362 and 364 and 366, tube 360 being insulatingly supported from tube 362 and tube 364 being insulatingly supported from tube 366. By moving the tubes 360, 364 in and out of tubes or pipe sections 362, 366, an adjustment in addition to the feedback adjustment given by condenser 356, 358 may be had. The plate tuning condenser is diagrammatically shown at 368 connected between the water cooling jackets 212, 214 of vacuum tubes 40, 38. The plate inductance coil in this instance consists of a single doubly wound metallic tube 370 provided with inlet and outlet water cooling ducts 372. Obviously the plate inductance may be made of straight tubes for very high frequency operation. Output energy may be taken from blocking condensers 374 and fed directly into an antenna or to any subsequent amplifier as found desirable. Plate potential is fed from conductor 242 through two choke coils 374, 376 to points 378, 380 on opposite sides of the electrical center of the coil 370 which center is preferably made between the inlet and outlet pipes 372. By closing switch 382, a section of the water cooled inductor 370 may be short circuited out of circuit causing, if desired, operation at some harmonic frequency. This construction is often desirable where mechanical considerations restrict the location of tapping points 378, 380, for, by adjusting the size of coils 374, 376 and the inductance of connections through the switch 382, it is often possible to adjust the circuits to either of two desired operating frequencies much more readily than can be done by varying taps 378, 380 alone. The line for frequency control is well adapted as explained in my above mentioned United States Patent No. 1,945,546, for control at either the fundamental or any harmonic frequency. It should also be noted that, if desired, I may provide more than one frequency controlling line and connect them to the grids of the tubes alternately or in various combinations to obtain various frequencies and conditions of operation. The changing of connections may be done by manual changing of connections or by means of selective switches as desired. In some cases one operating handle or mechanism will simultaneously operate switch 382 and change frequency controlling lines.

For modulation purposes voice currents from an audio frequency amplifier 384 are impressed upon the transformer 330 corresponding to the transformer 330 of Figure 2. In place of the battery 328 of Figure 2, however, a rectifier 386 has been illustrated in Figure 4.

The dimensioning of the line system of Figure 4 should be in accordance with the statements expounded for Figures 1 and 2 and the long line system may be supported, if desired, as shown in Figures 1a and 1b or may be suspended from an overhead structure such as the ceiling supporting girders of a power house.

Figure 5:
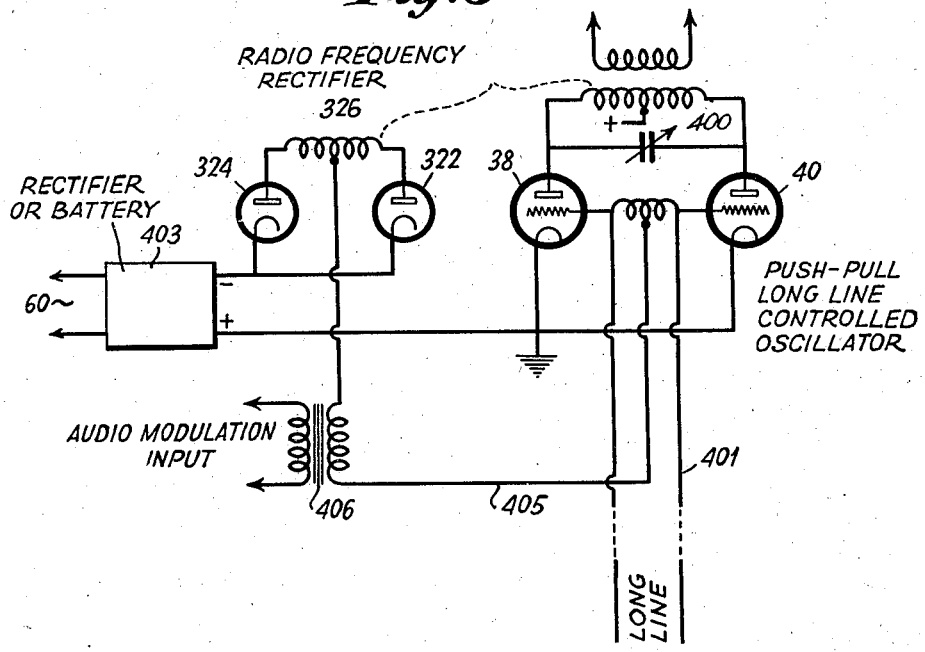

In the modification of Figure 5 the high frequency oscillator of the long line controlled type comprises tubes 38 and 40, having their anodes connected in a high frequency circuit 400 and their grids connected as in the prior modifications to a line 401. The rectifiers 322 and 324 are coupled at 326 to the output circuit 400. The cathodes are in series with a source of potential 403 connected at one terminal to the cathodes of tubes 38 and 40. The grid bias circuit is completed by connecting a symmetrical point on circuit 326 to a symmetrical point on circuit 401 by line 405. This connection includes the secondary of a modulation transformer 406.

Here, as in the prior modifications, some of the radio frequency energy from the oscillation circuit 400 is rectified in rectifiers 322 and 324 to obtain a negative grid bias voltage for the grids of the oscillator tubes 38 and 40. If the rectifier is coupled at its output close enough to the circuit 400 the bias potential developed in the rectifier will limit the amplitude of oscillations. If desired, the source of rectified current 403 may be connected in series with the rectifier comprising tubes 324 and 326 and excited by a 60 cycle power system. This second source of negative potential serves to adjust the circuits and potentials for best operation.

In operation the two sources of grid bias potentials, that is, the source produced in the rectifier comprising tubes 322 and 324, and the source derived from the 60 cycle power system, are adjusted to limit the oscillations to about half of maximum amplitude. In series with the bias sources is the secondary of the modulation transformer 406. The fluctuations in grid bias due to the modulations then varies the output of the oscillator in accordance with the said modulations.

In favor of the system as described in connection with Figure 5, is that the equipment required to do the modulating is relatively small and inexpensive.

I claim:

1. In a high frequency wave signalling system, a high frequency generator comprising, a pair of electron discharge devices each having a control grid, an anode and a cathode, a tuned output circuit connected to said anodes and cathodes, a frequency determining line connected to said control grids and cathodes, said devices, tuned circuit and line cooperating to produce oscillations of a frequency determined roughly by said tuned circuit and more accurately by said line, a rectifier coupled to said tuned circuit, means including an impedance connecting said rectifier in a direct-current circuit between the control grids and cathodes of said devices for rectifying produced oscillations and supplying a direct-current biasing potential to said control grids to limit the amplitude of the oscillations generated, and means for superimposing on said biasing potential a modulating voltage to thereby modulate the amplitude of the oscillations generated.

2. A system as recited in claim 1 wherein said rectifier is of the full wave type and wherein said impedance is of such a value that in the absence of modulating voltages the amplitude of the oscillations produced is limited to about one-half of the maximum amplitude of the oscillations the oscillator is capable of producing.

CLARENCE W. HANSELL.